United States Patent [19]
Balk

[11] Patent Number: 5,862,855
[45] Date of Patent: Jan. 26, 1999

[54] HYDRIDE BED AND HEAT PUMP

[76] Inventor: Sheldon Balk, 19753 Wintergreen Dr., Cupertino, Calif. 95014

[21] Appl. No.: 583,213

[22] Filed: Jan. 4, 1996

[51] Int. Cl.$^6$ .................................................. F28D 15/00
[52] U.S. Cl. ......................... 165/104.12; 62/480; 62/482; 62/477
[58] Field of Search ........................ 165/104.14, 104.12, 165/104.11; 62/476, 277, 480, 481, 482

[56] References Cited

U.S. PATENT DOCUMENTS

| | | | |
|---|---|---|---|
| 2,138,686 | 11/1938 | Altenkirch ................................. | 62/481 |
| 4,040,410 | 8/1977 | Libowitz . | |
| 4,044,819 | 8/1977 | Cottingham . | |
| 4,055,962 | 11/1977 | Terry . | |
| 4,136,530 | 1/1979 | Kantor . | |
| 4,309,980 | 1/1982 | McCormack et al. ......... | 165/104.12 X |
| 4,372,376 | 2/1983 | Nelson . | |
| 4,409,799 | 10/1983 | Nishizaki et al. ......................... | 62/467 |
| 4,413,670 | 11/1983 | Ritter ............................................ | 165/1 |
| 4,422,500 | 12/1983 | Nishizaki et al. .................. | 165/104.12 |
| 4,436,539 | 3/1984 | Ron . | |
| 4,523,635 | 6/1985 | Nishizaki et al. .................. | 165/104.12 |
| 4,581,049 | 4/1986 | Januschkowetz ...................... | 62/480 X |
| 4,819,717 | 4/1989 | Ishikawa et al. ................... | 165/104.12 |
| 4,928,496 | 5/1990 | Wallace et al. ................. | 165/104.12 X |
| 5,042,259 | 8/1991 | Jones . | |
| 5,142,884 | 9/1992 | Scaringe . | |
| 5,165,247 | 11/1992 | Rockenfeller et al. ......... | 165/104.12 X |
| 5,184,669 | 2/1993 | Tamme et al. .......................... | 62/480 X |
| 5,309,985 | 5/1994 | Erickson . | |
| 5,408,847 | 4/1995 | Erickson . | |
| 5,419,156 | 5/1995 | Sywulka .......................... | 165/104.12 X |
| 5,518,069 | 5/1996 | Maier-Laxhuber et al. ....... | 165/104.12 |

FOREIGN PATENT DOCUMENTS

| | | | |
|---|---|---|---|
| 988072 | 4/1951 | France ...................................... | 62/480 |
| 643267 | 4/1937 | Germany .................................. | 62/480 |
| 0171199 | 10/1982 | Japan ................................. | 165/104.12 |
| 0171200 | 10/1982 | Japan ................................. | 165/114.12 |
| 0026994 | 2/1983 | Japan ................................. | 165/104.12 |
| 0037486 | 3/1983 | Japan ................................. | 165/104.12 |
| 0047486 | 3/1983 | Japan ................................. | 165/104.12 |
| 4225762 | 8/1992 | Japan ....................................... | 62/481 |

OTHER PUBLICATIONS

"Characteristics and Applications of Metal Hydrides" MFS–26028, NASA Tech Brifes.

"Metal Hydride Heat Pumps", Altinisik and Veziroglu; International Journal of Energy Research, vol. 15, pp. 549–560 (1991).

Primary Examiner—Ira S. Lazarus
Assistant Examiner—Christopher Atkinson
Attorney, Agent, or Firm—George M. Steres

[57] ABSTRACT

A hydride bed structure includes a first and second set of separated hydride modules within a single hydrogen containing, sealed tank. Each set contains a hydride having a different equilibrium disassociation characteristic. Each set is thermally isolated from the other and the enclosing tank by a hydrogen permeable, thermally insulating material. The hydride in each set is divided into a plurality of spaced apart clusters with each cluster disposed in a respective concave cavity defined in one side of a sheet of thermally conductive material. A hydrogen porous, hydride impermeable member seals each cluster within the respective cavity. The convex side of the cavity protrudes into a thermal media transfer cavity on the opposite side of the sheet. The spacing and arrangement of the cavities/protrusions define a channel array between the protrusions. A pan member is bonded to the opposite side of the sheet and defines the thermal media cavity shaped to receive the protrusions therein. The thermal transfer media cavity contains a thermal transfer media disposed to flow in and around the channels defined therein. Thermal media flows into and out of the media cavities by media connections to external heat sinks/sources provided thereon. The spacing, configuration, area, and depth of the cluster cavities and the cluster quantity of hydride contained therein is chosen to provide improved cycle time and efficiency for using the hydride bed modules for pumping heat or storing and supplying hydrogen gas.

13 Claims, 5 Drawing Sheets

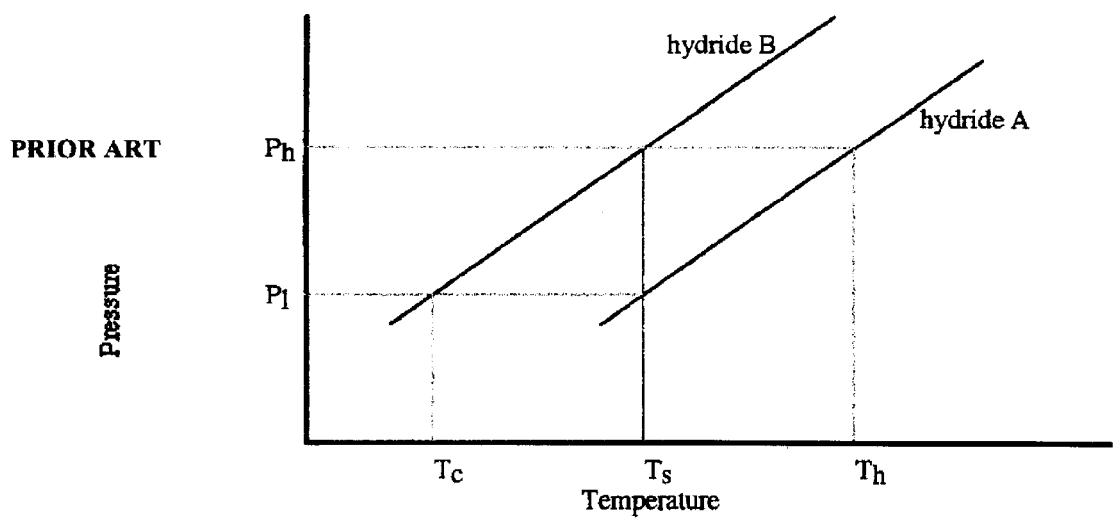
Fig. 1 van't Hoff relationships

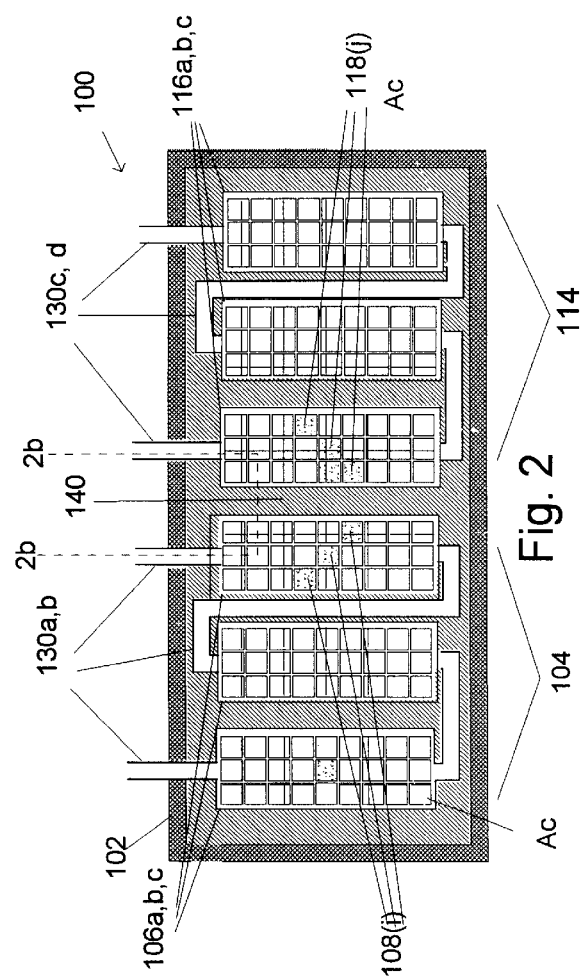

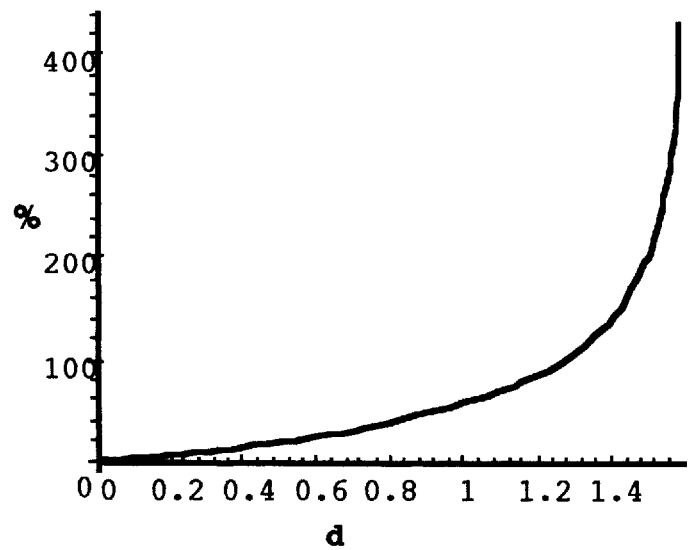
Fig 3 % Rcyl over Rrec
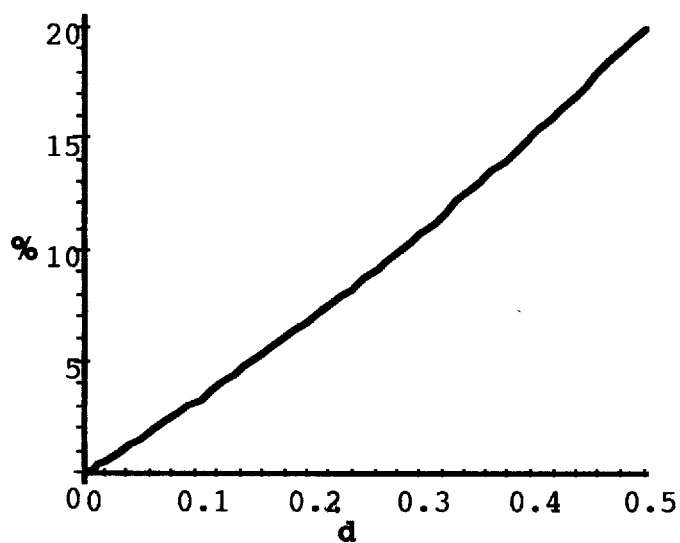
Fig 4 % Rcyl over Rec

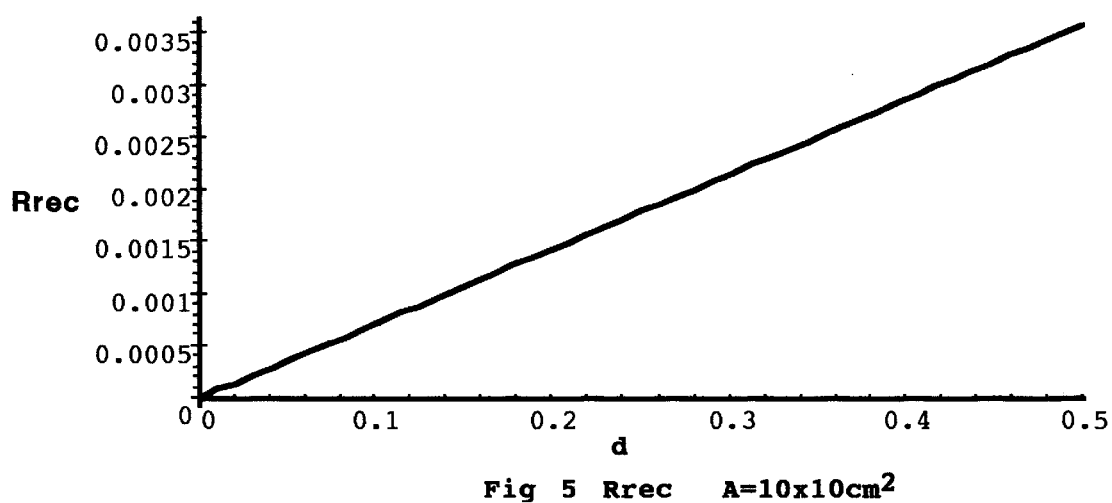
Fig 5  Rrec   A=10x10cm²

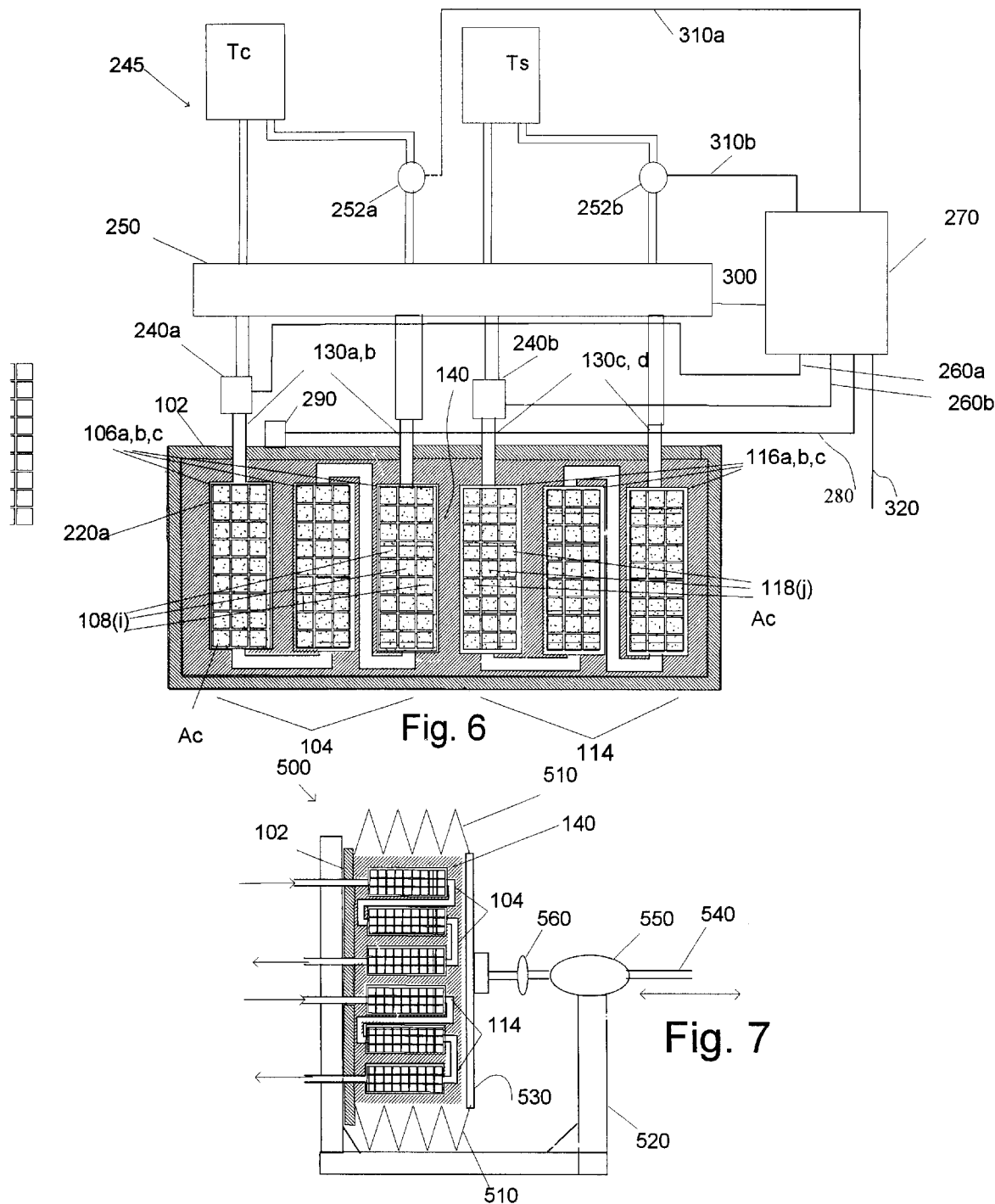

HYDRIDE BED AND HEAT PUMP

FIELD OF INVENTION

This invention relates to a hydride heat pump heating and cooling apparatus using the heat of formation of a hydride. It specifically relates to such apparatus having improved hydride container configurations.

BACKGROUND

Hydride Theory

Hydrides are chemical compounds formed when hydrogen gas reacts with certain other substances. Usually the substance is a metal such as Ca, Mg, Li, U, V, LaNi$_5$, FeTi etc. Other organic and inorganic chemicals are known to form hydrides. The present invention can make use of any of the hydride forming substances however metal, specifically LaNi$_5$ is used for illustrative purposes.

The phase changes during formation and decomposition of the metal hydrides is accompanied by significant flows of heat. This heat of reaction must be rejected (formation) or provided (decomposition) by an external heat sink or source for the phase change to occur. For example, approximately 210 Joules (watt-seconds equivalent to 0.1991 BTU) of heat is generated by the exothermic reaction from converting one gram of Lanthium Nickel (LaNi$_5$) into a hydride (LaNi$_5$H$_6$) and must be rejected to an external heat sink. Conversely, approximately the same amount of heat must be absorbed from an external source by the hydride in order to release the hydrogen and return to the metal state.

The absorption and desorption of hydrogen can be controlled by variations in hydrogen pressure or temperature of the metal. The relationship between pressure and temperature at equilibrium is given approximately in accordance with the van't Hoff equation:

$$\ln(P) = A - B/T$$

where P is the pressure of the hydrogen in kilo-Pascal (kPa), T is temperature in Kelvin, A and B are constants depending upon the hydride. Variation of either the pressure or temperature causes a corresponding change in the other parameter in accordance with this equation, resulting in a new equilibrium condition, providing that a means is available to accommodate the heat generated or liberated that accompanies the change.

Each type of hydride will typically have a unique set of technical information (e.g. equilibrium disassociation pressure characteristic, (EDP) available from the supplier (for example, Ergenics Inc., Ringwood N.J.) that will allow solution of the van't Hoff equation for equilibrium pressure at the design temperatures. The technical data will also include the heat requirements (reaction energy) of the hydride in the form of Kilo-Joule per gram (kJ/g) or BTU/lb of hydride. This information is used in the thermal design of the system to determine the quantity of hydride required to make the desired heat exchange.

Heat Pump

A hydride heat pump is based upon the concept of transferring hydrogen gas between two different, thermally isolated hydrides. The hydrogen is forced out of one hydride (hydride A$_h$ in the discussion that follows) in a manner that allows it to be absorbed by a second hydride (hydride B$_h$ in the following). It is then forced out of the second hydride at which time it is reabsorbed into the first hydride. The forcing action is provided by external heat or pressure sources. Typically, heat is provided to force the gas out of the first hydride and heat must be absorbed from a source (refrigeration) to enable the release from the second hydride.

Heat pump requirements are stated in terms of amount of heat that must be moved in a given period of time-for example BTU/hr. Large amounts of heat will result in requirements for large amounts of hydride or for the use of smaller amounts that are cycled frequently enough over a period of time to pump the equivalent amount of heat. For example one gram of hydride (LaNi$_5$H$_6$) can be used to pump approximately 0.2 BTU per cycle. If the pump is able to cycle 20 times an hour, 4 BTU per hour can be pumped with one gram instead of twenty grams cycling once per hour. Cost and complexity of hydride systems have limited their use in the past. Both cost and complexity are reduced with a design prioritized to allow for rapid cycling.

Shown diagrammatically in FIG. 1 are the typical van't Hoff temperature and pressure profiles for typical hydrides, A$_h$ and B$_h$. The hydrides are chosen such that the equilibrium pressure of one (hydride B$_h$) is appreciably higher than the other (hydride A$_h$) at the same temperature at which each will be rejecting heat to the environment (T$_s$).

The heat pump is designed to operate between three temperatures. The first temperature T$_s$, is the sink temperature, usually that of the external environment to which heat will be rejected from each hydride in sequence. The second is the temperature T$_h$ to which one of the hydrides (hydride A$_h$) must be raised, providing the heat necessary to cause it to desorb all of its hydrogen at its equilibrium pressure. The third, T$_c$, is the temperature at which the desorbing hydride (hydride B$_h$) will extract heat from its environment (heat exchanger).

At one step of a complete cycle$_1$ hydride A$_h$ is thermally connected to a source of high temperature (T$_h$). T$_h$ is the temperature which causes hydride A$_h$ to desorb hydrogen at its equilibrium pressure P$_h$. With hydrogen pressure at P$_h$ connected to a chamber containing hydride metal B$_h$, hydride B$_h$ will absorb gas (forming the hydride phase) providing it can reject the heat of formation to the heat sink at T$_s$. Hydride B$_h$, is therefore simultaneously thermally connected to the external environment, at temperature T$_s$, rejecting the liberated heat.

When hydride B$_h$ is fully charged (has absorbed all the hydrogen it is capable of at temperature T$_s$, it is disconnected from the heat sink and thermally connected to T$_c$, the environment to be cooled. Hydride A$_h$ is simultaneously disconnected from the T$_h$ source and connected to the environment at temperature T$_s$, while simultaneously in hydrogen communication with hydride B$_h$.

Hydride A$_{h^1}$, at temp. T$_{h^s}$, will reject heat to the environment at T$_s$, and will attempt to reach equilibrium at pressure P$_l$ and begin to absorb hydrogen. As the gas pressure drops to P$_1$, desorption of hydrogen from hydride B$_h$ draws heat from its environment as it attempts to reach its equilibrium temperature T$_c$ and providing hydrogen for hydride A$_h$ to absorb. The cycle repeats when hydride B$_h$ is discharged (hydrogen desorbed) and hydride A$_h$ is fully charged again.

Hydrides A$_h$ and B$_h$ typically communicate thermally with the heat sources and sinks by means of piping and valves controlling the flow of a thermal exchange media (working fluid or fluids) through heat exchangers (not shown). The hydrogen gas itself may also be used as a thermal working fluid.

Hydrogen communication between hydrides A$_h$ and B$_h$ typically require additional piping and valves between the two separate tanks. It would be an advantage to eliminate the thermal mass and excess volume necessitated by such hydrogen pipes and valves.

One characteristic of hydrides that must be dealt with is the change in volume of the hydride as it absorbs and desorbs hydrogen. The volume of the hydride typically changes by about 25% as it goes through a complete absorption/desorption cycle. Metal hydrides also typically are extremely friable and become broken into small particles, of a powder-like form due to repeated hydriding cycles. The powdery hydride material is typically held in a strong pressurized tank, contained in a receptacle termed the hydride bed. If the hydride is constrained in a fixed volume container, the expansion of the hydride as it absorbs hydrogen can exert great stresses on the hydride receptacle.

The hydrogen gas being absorbed and desorbed from the hydride material is a good conductor of heat, tending to keep the particulate hydride material and hydrogen gas nearly in thermal equilibrium as they interact. Thermal losses in a heat pump are due in part to the transfer of heat between the hydrogen gas and the associated pressure containers, pumps, piping and valves, including any heat exchanger fluid and materials.

Discussion

Thermodynamic issues effecting efficiency

The thermodynamic processes involved in the hydriding are controlled mainly by physics. The designer can only select what appear to be appropriate hydride metals for the task at hand with prior art hydride heat pump configurations. There are however, thermodynamic considerations that effect the efficiency and therefore operational cost of a hydride heat pump.

The first consideration deals with the reduction of thermal mass. All of the physical components of the heat pump (hydride metal, tanks, piping, working fluid exchange pumps and working fluid etc) have some mass and each component mass has an individual specific heat-that amount of heat (in Joules) required to raise the mass one degree centigrade. That heat is stored in the mass or given up as the temperature of the mass is cycled and usually does no useful work. It is therefore waste heat. Waste heat can be reduced by using smaller masses of materials and using materials with lower specific heat values.

Previous art heat pumps typically use two separate pressure containers (tanks) to isolate the two hydrides. This results in a large amount of extra mass and subsequent extra waste heat per cycle. It would be an advantage to reduce the amount of mass of the pressure containing vessels, piping, and pumps to reduce wasted heat.

Reducing the amount of hydride metal needed is another method of reducing the thermal mass and waste heat. It would be an advantage to cycle smaller amounts of hydride metal more frequently in order to pump a given amount of heat in a given time.

The second thermodynamic consideration is the thermal resistance between the each particle of hydride and the external thermal sink or source. Heat transfer is controlled by the temperature difference between two objects (hydride metal and source/sink) and by the thermal resistance between them. The lower the resistance, the higher the heat flow for a given temperature difference. The temperatures are usually dictated by the environment, hydride operation etc. The thermal resistance can be controlled by design. Thermal resistance is most simply defined as $$\frac{\text{material thickness}}{\text{thermal conductivity times area}}$$

The thermal conductivity of the material is given in terms of heat flow per unit area (through which the heat flows) per degree of temperature per unit time. It is actually a measure of rate of heat flow through the material. Low thermal resistance results from high thermal conductivity, large area over which the heat can flow and minimal thickness through which it has to travel. The significance of low thermal resistance is that a greater amount of heat per unit time can flow, speeding up the transfer of heat into and out of the hydride material (hydride bed).

The third thermodynamic consideration design option deals with the reduction of thermal leakage, i.e. excess or unwanted heat flow. Heat that flows back and forth directly between the hydride beds at different temperatures without being transferred through the hydriding reaction is wasted and constitutes heat loss from the system. The leakage reduces the amount of useful heat "pumped" by the hydrides exchanging hydrogen. It is an advantage to increase the thermal isolation of the different hydride beds (first and second hydrides) which reduces or eliminates this source of leakage.

It would be advantageous to provide a hydride bed system which results in pumping less heat per cycle (heat loss) from the heat source and pumping the useful heat much faster (lower thermal resistance) increasing the cooling (heating) rate for a given size heat pump.

Desorbing Temperature $T_h$

The desorbing temperature $T_h$ is typically derived from waste heat, solar collectors, boilers or other heating devices capable of supplying the required temperature to a heat exchanger.

Not all heat pump applications will have available the necessary heat source but may have access to electrical power. In those circumstances, thermal energy at temperature $T_h$ is easily provided through the use of an electrical heating coil or element in thermal contact with the hydride.

Environmental Temperature $T_s$

The rejection of heat from the hydrides depends upon the environmental temperature $T_s$. As $T_s$ varies, so also will the equilibrium pressure $P_l$ in hydride A, and therefore the temperature $T_c$ at which hydride $B_h$ will attempt to absorb heat from its surroundings. The importance is that as the outside sink temperature, $T_s$, gets very hot (summer-desert) maximum cooling is needed but the cold temperature rises reducing the cooling capacity. The variation in $T_s$ and $T_c$ must be taken into account in the design of the heat pump. An electronic processor is well suited to function as an automatic controller to account for temperature variations[1].

[1]. References: 1. Characteristics and Applications of Metal Hydrides-George C. Marshal Space Center NASA Tech Brief MFS-26028 2. Metal Hydride Heat Pumps-Altinisik and Veziroglu International Journal of Energy Research Vol 15 549–560 (1991)

PRIOR PRACTICE

Heat pumps have been disclosed that use the absorption and desorption of heat by a hydride. Previous systems (for example, Terry U.S. Pat. No. 4,055,962 Nov. 1, 1977) typically use two different hydrides in separated tanks (beds) connected by plumbing for the flow of the hydrogen gas.

Following the cycle illustrated in FIG. 1, the temperature of each tank is cyclically controlled to achieve absorption and desorption of hydrogen resulting in the transferring of heat. The temperature in one tank is raised, forcing a flow of hydrogen out of the first hydride (referred to as hydride $A_h$) under pressure to a second tank where the hydrogen is absorbed in a second hydride (referred to as hydride $B_h$) accompanied by the removal of the exothermic heat. The temperature in the first tank is then lowered causing a drop in pressure relative to the second tank resulting in the flow of hydrogen back to the first tank. As the second bed desorbs (loses) its hydrogen, it must absorb heat from its environment, providing the cooling.

Control of the temperature cycling requires a controller to actuate the switching (spooling) of heat exchangers or heating elements. Typically three external heat exchangers are required. One providing the desorption temperature $T_h$, one rejecting heat to the environment at $T_s^1$, the sink temperature, and one absorbing heat from the cooled environment at temperature $T_c$.

Examples of prior disclosures and their attendant complexities are described in U.S. Patents:

U.S. Pat. No. 4,040,410-Libowitz, Sep. 9, 1977
U.S. Pat. No. 4,044,819-Cottingham, Sep. 30, 1977
U.S. Pat. No. 4,055,962-Terry, Nov. 1, 1977
U.S. Pat. No. 4,136,530-Kantor, Jan. 30, 1979
U.S. Pat. No. 4,372,376-Nelson, Feb. 8, 1983
U.S. Pat. No. 4,409,799-Nishizaki, Oct. 18, 1983
U.S. Pat. No. 4,436,539-Ron, Mar. 13, 1984
U.S. Pat. No. 4,523,635-Nishizaki, Jun. 18, 1985
U.S. Pat. No. 5,042,259-Jones, Aug. 27, 1991
U.S. Pat. No. 5,142,884-Scaringe, Sep. 1, 1992
U.S. Pat. No. 5,309,985-Erickson, May 10, 1994
U.S. Pat. No. 5,408,847-Erickson, Apr. 25, 1995
U.S. Pat. No. 4,422,500-Nishizaki, Dec. 27, 1983

Studies done for the U.S. Government (Characteristics and Applications of Metal Hydrides, NASA Tech Brief MFS-26028, July 1985) have shown that cycle rates are dependent upon the hydride kinetics and are dominated by the heat transfer capability of the hydride bed. Results reflect the empirical test configuration and computer simulation. In general it would appear that 90% absorption and desorption at high pressure ratios (~3.4) can take as little as 30 to 50 seconds with good thermal transfer.

Design Considerations
Multiple Tanks

Designs described in the above patents have made use of multiple tanks connected by hydrogen plumbing (pipes), each tank holding a single hydride (first or second), providing thermal isolation between the hydrides and providing various heat exchanger configurations for each.

Alternatively, Nishizaki, in U.S. Pat. Nos. 4,409,799, and 4,422,500 incorporated herein by reference, has described partitioned but connected hydride containers in turn embedded in separately closed heat exchange chambers, requiring complex joining of chambers to maintain hydrogen and/or thermal exchange fluid sealing. Also the partitioned hydride chambers, being metal, provide paths for thermal leakage and loss of efficiency due to heat loss.

Each of the multiple tanks described in prior patents must be designed for:

1. The hydrogen pressure variations encountered.
2. The pressure variations caused by the expansion and contraction of the metal hydride (25–30% expansion).
3. The tanks, plumbing and any valving (spoolers) used must be designed for the long term containment of hydrogen gas.
4. Previous patents show, but do not address the varying amounts of "dead space" between the actual hydride masses in each tank. The "dead space" consists of empty tankage, connecting pipes, valving and other hydrogen gas coupling. This empty space must be filled with free hydrogen gas at the cyclic operating pressure of the pump.
5. The excessive dead space can allow the hydrogen released from one of the hydrides to expand under pressure and significantly reduce the available gas pressure required for hydration (absorption) in the other hydride. This results in a larger volume of hydride and hydrogen gas to pump a given amount of heat.

Whereas the various configurations are technically sound, they do not adequately address the efficiency penalties of large thermal mass of the tanks, piping and pumps nor the importance of reducing thermal resistance between the hydrides and the external means of temperature exchange. These complex systems with the required assembly processes mitigate against low cost mass production manufacturing needed in order to promote wide spread usage and replacement of systems using Freon type refrigerants.

Hydride Bed

Previous patents have addressed issues of cyclical expansion and contraction of the hydride, and containment of hydride particles. Hydride breaks down into micron size particles as a result of the internal cyclic stress of the hydriding process. Technically, they will function better the smaller the particles become since the increased particle area per unit weight allows for more rapid absorption and desorption of hydrogen. However the overriding concern is the transfer of heat to and from the particles. That calls for a means of maintaining close thermal contact with the heat exchangers while providing loose packing for expansion.

The solution used by many others has been to place micro-porous filters in the tanks holding the hydrides, or in the pipe lines connecting them: allowing passage of hydrogen but not hydride particles. Depending on the temperature ranges being used, micron filters are available in the form of sintered metal, wire mesh laminates, fretted glass, PTFE film etc.

Other solutions presented involve the fabrication of porous metal structures (matrices) with the hydride metallurgically constrained in the pores of the matrix: e.g. U.S. Pat. No. 4,292,265, U.S. Pat. No. 4,607,826, Aug. 26, 1986 (Ron) and U.S. Pat No. 4,507,263 (Ron). These techniques provide containment of the particles and some improvement in thermal transfer while requiring additional manufacturing steps, complexity and cost.

Various forms of hydride beds have been proposed. Nishizaki, U.S. Pat. No. 4,523,635 ('635), incorporated herein by reference, proposes a cylinder or tank containing an assembly of longitudinally extending cylindrical pipes, each pipe having a external heat exchange surface in contact with a thermal exchange fluid inside the tank. The cross section of the interior of the pipe is divided into an array of wedge shaped sectors by radial fins from the center of each pipe to it's internal surface. A hydride metal of given EDP characteristic is contained within each wedge shaped sector.

At least one sector includes a central porous, flexible passage for the hydrogen gas. The flexible passage expands under pressure of the expanding hydride. The cross section of the pipe as shown indicates the wedge sectors are completely filled with hydride. One end of each pipe is joined with the end of the other pipes in the tank to a flow passage for hydrogen to flow to another similar cylinder enclosing pipes containing a different hydride. Other pipes and valves are interposed between separate tanks to control the flow of hydrogen therebetween. Thermal fluid connections are made between separate tanks including fluid valves and other controls to control the exchange of thermal fluid between the tanks and external heat sources and sinks of different temperatures.

With regard to FIG. 16 of the Nishizaki '635 patent, there is shown a heat pump system incorporating four different temperature heat sources/sinks; T1, T1', T3 and T4, having a switchable thermal media flow connections 253, 254, 221, 222, 212, 256, 232, 236, 623, 667, 238, 243, 448, 255 for controlling the flow of thermal media from one tank to another.

A major limitation in cycle speed of the '635 disclosure is the thermal transit time from all of the hydride particles to the nearest heat exchange surface (the exterior wall of the pipes) to the most remote hydride particles (the hydride nearest the center of the pipes). The thickness of the bulk hydride packed between the outer pipe wall and the center of the pipe limits the rate at which the hydride can be heated and, in turn cooled. The hydriding process creates a fine (micron) size powder with a nominal thermal conductivity of 1.4 $W/m^2$-deg K. This low value of thermal conductivity limits the rate of flow of heat through the bulk material, requires significant elapsed time to complete each thermal cycle. Nishizaki reports thirty minute transfer times for the '635 design. It would be an advantage to have the maximum distance from the hydride to the nearest heat transfer surface be as thin as possible to reduce thermal resistance.

One disadvantage of the separate tank structure is the waste volume dedicated to the piping and valving between tanks containing different hydrides, of both the hydrogen flow passages and the thermal fluid piping. The hydrogen in the piping expands and contracts as it is thermally cycled, thereby wasting the heat of expansion and contraction. It would be an advantage to minimize the wasted hydrogen volume.

In addition, the excess thermal mass of external piping and valving must be thermally cycled along with the hydrogen gas and the hydride itself. Minimizing external piping and valving would increase the efficiency of the system.

Another disadvantage of this structure is the required strength of the pipe walls and fins necessary to withstand the expansion of the hydride as hydrogen is absorbed. The flexible passage can absorb the expansion in the wedge sector in which it is contained, but has less effect on the other sectors. Additional flexible passages can be provided within the other sectors, with consequent increase in wasted volume and manufacturing complexity.

These and similar structures require complex manufacturing processes to maintain packing density and thermal integrity at all times between all of the hydride particles and the thermal exchange surfaces.

SUMMARY

An improved hydride heat pump is described that improves upon previous heat pumps by:

1. Using a single sealed hydrogen chamber (instead of two or more) containing different hydrides, thereby eliminating hydrogen gas plumbing and valving.
2. Providing thermal isolation separating the hydride beds in the single sealed chamber while allowing gas to flow freely between them, eliminating temperature cycling of the single sealed chamber structure with attendant wasted heat loss.
3. Providing hydride beds with simplified design and increased thermal transfer area to the thermal exchange fluid, reducing the thermal resistance of the hydride bed to the external heat source/sink(s). Reducing thermal mass and therefore reduced "waste heat" resulting in low thermal transfer time per cycle.
4. Providing optional use of a built in electrical foil heater in one of the hydride beds further simplifying the design and fabrication of the heat pump by eliminating one external fluid heat exchanger and its valving.
5. Using one pressure tank to contain the hydride beds instead of two tanks can reduce the thermal mass almost in half since pressure tanks must be strong (thick and heavy) and constitute a large portion of the system mass.

The result is simplified fabrication and faster thermal response, allowing higher cycling rates and pumping more heat with smaller, more cost effective heat pumps. Computer simulations confirm cycle times of less than 5 minutes compared to 30 minutes reported in referenced patents.

Additional embodiments are described including using a sealed bellows for the chamber, coupled to the hydrogen gas, allowing the expanding and contracting gas to do some mechanical work.

Features
Elimination of multiple tanks

1. A single pressure tank is used for containment of the heat pumping elements of the heat pump, including all of the hydrogen gas, eliminating the cost of multiple tank structure and eliminating the thermal mass of the second tank.
2. Hydrogen plumbing is eliminated reducing complexity, cost and risk of leakage. The hydrogen is entirely contained in a single sealed tank.
3. The reacting hydride masses (beds) are in close proximity in a single tank but are thermally isolated from each other by use of porous insulating material, reducing heat loss.
4. The thermal insulation reduces the dead space in the tank that detracts from the differential hydrogen pressures developed by the hydriding process.
5. The smaller "dead space" in the tank reduces the amount of free hydrogen (not contained in the hydride phase) available in case of leakage. This is a safety factor since hydrogen held in the hydride form has been proven safe by Government studies. Free hydrogen in dead space is at some net pressure resulting in potentially large volumetric expansion in case of a leak.

Integrated Hydride Bed and Heat Exchanger

1. A laterally extended thermally conductive thin sheet, has one side formed (or waffled) into a top surface with a planar array of laterally spaced apart adjacent concave cavities. Each concave cavity defines a receptacle for receiving a respective one cluster of hydride metal powder. Each concave cavity is covered with a hydrogen porous but hydride impermeable membrane, that inhibits the hydride from migrating around and bunching (packing) together as the hydride becomes fractured into particles during operation. The volume of the cavity and the cluster of hydride are arranged such that the hydride cluster completely fills the cavity volume when the hydride cluster is fully absorbed with hydrogen.

The cavities may be formed by normal manufacturing methods such as punching, drawing and the like. The opposite side of the cavities are convex protrusions that extend away from the planar sheet. The surface area of the convex protrusions is thus greater than the area of the sheet from which it is made. This results in a net increase in thermal transfer area for heat transfer across the surface of the sheet from the cavities to a heat transfer media adjacent to the convex protrusion side.

In this application, the term cluster refers to a generally contiguous batch of hydride material constrained in a single concave cavity. It is known that hydrides may be of different form, e.g., metal hydride particles, hydride liquids, gels, fibers and the like. The term, hydride cluster, therefore is intended to include any form of a hydride material which may be contained in a respective concave cavity. This invention provides a means of utilizing any form of hydride which may be contained by a hydrogen porous, hydride impermeable membrane or film within a concave cavity. This invention eliminates the necessity of embedding the hydride in an inactive matrix material, thereby reducing unnecessary weight and excess thermal mass.

In this application, the term concave refers to any depression, hollow, indentation and the like, and may be of any desired cross-section. It may include uniformly curved sections of a sphere, an oblate spheroid, truncated conical sections or irregular depressions having arbitrary polygonal cross-sections. The concavity may define a periphery along the sheet having a uniformly curved outline, such as a circle, ellipse and the like. The periphery may be a regular polygon such as a square, rectangle or may be an arbitrary polygon.

2. The waffled sheet has a heat transfer surface opposed to the concave cavity side of the sheet formed of the convex protrusions. The heat transfer surface is adjacent to a thermal exchange fluid for transferring heat to and from the hydride clusters and a remote heat sink or source. The combination of the waffled planar array and the cavities increases the area available for heat transfer in and out of the hydride through the conductive sheet and fluid. The spaces between adjacent convex protrusions forms an array of channels for directing the flow of thermal exchange fluid. The spaced apart protrusions and channels may be arranged to provide a means for inducing turbulent flow of the fluid which improves the transfer of heat into and out of the cavities.

3. A shallow pan having an interior is formed to receive the opposed side of the waffled sheet array therein. The pan has a perimeter suitably fashioned to be fastened or bonded to the side of the array opposed to the concave cavities and forms a mechanically integrated thermal exchange media cavity structure for containing the thermal exchange working fluid. The integrated media cavity directs the flow of the working fluid for thermal exchange around the sheet between the convex side of the hydride cavities and the external environment. The hydride bed module is easily manufactured. The integrated structure (hydride module) provides a method of holding the metal hydride particles in close contact with one surface of the planer surface which in turn is in close contact with the heat exchange media flowing through the hollow cavity on the opposite side of the surface.

4. Expansion volume of the hydride is reduced by using small cavities appropriately sized to contain the hydride material. The cavities are sized to be just filled by the metal in its hydrided (expanded) form with no stress to the hydride container.

When the hydrogen is desorbed and the metal contracts, the cavity contains a minimum 'dead' (empty) space.

5. Electrical heating elements can be easily integrated into the cavity as required for specific applications.

6. The modules can be mass produced and loaded with appropriate hydride metal type depending upon specific application requirements. Multiple modules of the same hydride metal type can be further assembled into banks for increased heat pumping capability.

Thermal Mass

Thermal mass of hydride bed structure embodiments in accordance with this invention are minimized thereby minimizing system losses during the temperature cycling of the combined thermal mass of the tank, hydride and heat exchanger.

Thermal insulation extends completely around and between the heat exchangers and hydride beds thereby reducing the thermal mass contribution of the tank (hydrogen chamber) and pressure lid which is typically metal for strength (but may be made of plastic in some applications). As a result, the mass of the tank does not undergo temperature cycling as in prior art, but remains at ambient temperature throughout operation. Elimination of gas plumbing further reduces heat loss carried away by the hydrogen gas. Hydrogen with a specific heat of 13.5 kJ/Kg per deg C. (compared to air—1.0 kJ/Kg or even Helium at 5.2 kJ/Kg per deg C.) can transport significant heat which is dissipated in plumbing but contained in the proposed single tank.

Mutual heat loss between the thermal mass (thermal load) of each of the hydride beds is reduced by maintaining separate, thermally isolated beds. Where the two different hydrides are located at opposite ends of a common container a thermal leakage path exists across the joining container. The leakage adds to the thermal loses, reducing the independent control of the temperature in each hydride bed. This reduces the efficiency and extends the cycle time that it takes for each hydride to reach equilibrium.

Reduction of thermal mass and reduction of heat loss permits faster reaction (cycling) time for the hydride beds, desirable for increased efficiency and lower system cost.

Thermal Exchange Area

Reduction of thermal resistance in the hydride bed as well as the heat exchangers reduces the time that it takes to transfer heat under given conditions. Since the thermal conductivity of the hydride is determined by the hydride used in each bed, the geometry of the bed becomes an important design option to reduce thermal resistance.

The use of a planer (flat) surface is preferred over a cylindrical surface. The thermal resistance through the wall of a coaxial cylinder of hydride having an inner radius and an outer radius is given as (Heat Transfer, Holoman, McGraw-Hill)

$$Rcyl = \ln(r_1/r_2)/2\pi K l$$

where

Rcyl=thermal resistance of the cylinder $r_1$ is the radius of the cylinder-outer radius of the hydride bed $r_2$ is the inner radius of the hydride bed K is the thermal conductivity of the hydride l is the length of the cylinder Thermal resistance through the thickness of a rectangular plate of a hydride bed is Rrec=d/(Kw l)

where

Rrec=thermal resistance of planer configuration w is the width of the bed l is the length of the bed d is the thickness of the bed FIG. 3 is a plot of the percent increase of thermal resistance of a coaxial shape over the thermal resistance of a rectangular volume shape for equal hydride thickness. The rapid rise as d approaches 1.4 is due to $r_1=w/2\pi$ for the cylinder surface to have the same area as the rectangle (l being the same in both cases). Since $r_1-r_2=d$, d cannot exceed $r_1$ for comparison purposes. A width of 10 cm was used for plotting purposes.

FIG. 4 is an expanded view of FIG. 3 for d from 0 to 0.5, the practical range for hydride thickness, expanding the plot detail for thicknesses of interest up to 0.5 cm. For dimensions given in centimeters, a cylindrical bed with a thickness of 0.5 cm will have almost 20 percent higher thermal resistance than a planer bed of 0.5 cm.

FIG. 5 shows the calculated thermal resistance for a 100 $cm^2$ area for d up to 0.5 cm. At d=0.5 cm, the thermal resistance of a coaxial shape would be (FIG. 4) almost 20% higher.

OBJECTS OF INVENTION

It is an object of this invention to raise the efficiency and lower the cost of hydride type heat pumps making possible mass production of low cost, common modules to replace Freon type refrigerants. Other objectives include:

1. To reduce unnecessary thermal mass.
2. To lower system heat loss through use of a single thermally isolated pressure tank.
3. To reduce wasted heat leakage between the hydride beds.
4. To decrease the time required to thermal cycle the total hydride mass.
5. To provide a more efficient integrated, modular hydride bed and heat exchanger.
6. To divide the total mass of hydride particles into smaller clusters to minimize the maximum distance between a heat exchange surface and the hydride particles for a given volume (mass) of hydride
7. To increase a given amount of heat to be pumped (cooled) in a given amount of time by cycling a smaller hydride mass faster.
8. To provide a simpler heat pump design that is easily manufactured using low cost, readily available mass production methods.

DRAWINGS

BRIEF DESCRIPTION OF FIGURES

FIG. 1 is a graph of the van't Hoff pressure-temperature relationship of two typical hydride metals illustrating the operational cycle of a hydride heat pump.

FIG. 2 illustrates a plan view of the interior of a single tank which contains multiple working hydride modules in accordance with this invention.

FIG. 2b is a partial offset elevation cross section of a portion of the modules of FIG. 2 along line 2b.

FIG. 3 is a graph showing the increase of the relative thermal resistance of a cylindrical bed of hydride over a planer (rectangular) bed of the same thickness, d, as the thickness increases.

FIG. 4 is a graph of an expanded portion of FIG. 3.

FIG. 5 is a graph showing the calculated thermal resistance of a planer rectangular (flat) bed of hydride in accordance with this invention as the cavity depth varies from 0 to 0.5 cm. for a bed area of 10 cm.×10 cm.

FIG. 6 illustrates schematically one embodiment of a heat pump incorporating a single tank containing two banks of different hydride beds in accordance with this invention.

FIG. 7 illustrates a schematic of a heat pump (not showing external components) where the tank is replaced by a sealed bellows in accordance with one embodiment of this invention.

DESCRIPTION OF ONE EMBODIMENT OF A HYDRIDE BED STRUCTURE OF THE PRESENT INVENTION

A first embodiment of a hydride heat pump bed structure 100 in accordance with the present invention is shown for illustration purposes in FIG. 2 and 2b. A single hydrogen impermeable sealed pressure tank 102 contains; (1) a first hydride bed bank 104 which includes three hydride bed modules 106a, b, c, and (2) a second hydride bed bank 114 which includes three hydride bed modules 116a, b, c. The modules 106a, b, c contain a first selected hydride, for example hydride $A_h$ referred to above. The modules 116a, b, c of the second hydride bed bank 114 contain a second selected hydride for example, hydride $B_h$ referred to above. The hydrides $A_h$ and $B_h$ have different equilibrium disassociation pressure characteristics (EDP) selected according to the requirements of the temperatures of the associated heat sources and sinks as explained above. The hydrogen tank 102 includes a flow connection (e.g. an inlet valve) 246, and an external hydrogen source, (e.g., a hydrogen supply tank) 248 for filling the tank 102 with hydrogen gas.

Each hydride bed module 106a–c, 116a–c is an independent module consisting of an integrated structure of the respective hydride metal and a heat exchanger allowing thermal control of the bed by circulating an appropriate heat exchange media through it as explained further below. A detailed description of the modules 106a and 116a will explain the structure of each of the other modules 106b, c of the bed 104 and modules 116b, c of bed 114.

The modules 106a, 116a each include a planar array of laterally disposed spaced apart hydride cluster cavities 108(i), 118(j). Each cavity 108(i), 118(j) is defined as a depression or hollow having an area, Ac, and depth, Dc, on one side of thin sheets 150a and 150b of material having high thermal conductivity. The cavities 108(i), 118(j) define respective concave surfaces 109a(i), 109(j) on the one side of the sheets 150a, 150b sized to each contain a respective cluster 110a(i), 110b(j) of hydride $A_h$, $B_h$. The formation of the sheet 150a, 150b defines respective laterally disposed planar arrays of convex surfaces 111a(i), 111b(j) on the opposite sides of the sheets 150a, 150b adjacent to each respective concave surface 109a(i), 109(j). Portions of the thermally conductive sheet 150a, 150b therebetween provide an efficient heat transfer material between the concave surfaces 109a(i), 109(j) and the respective convex surfaces 111a(i), 111b(j) of each cavity 108(i), 118(j). Each cluster 110a(i), 110b(j) of hydride is sealed within the respective cavity 108(i), 118(j) by one of a plurality of sealing membranes 112a, 112b bonded to the one side of the respective sheet 150a, 150b. The membranes 112a, 112b are each porous to the flow of hydrogen, but impervious to the passage of the hydride, $A_h$, $B_h$, contained therein.

A first and second thermal media cavity 120, 122 is defined adjacent to the convex surface 109a(i), 109(j) of each cavity 108(i), 118(j) on the opposite side of the sheets 150a, 150b. The media cavities 120, 122 are defined between the other side of sheets 150a, b and a spaced apart portion of respective fluid impermeable shallow pan members 190a, 190b. The pans 190a, 190b are adapted to receive and enclose the respective array of convex surfaces 111a(i) and 111b(j) of the cavities 108(i), 118(j) by being sealed to the opposite sides of the sheet 150a, b respectively at sealing perimeters 191a, 191b.

The adjacent convex surfaces 111a(i) and 111b(j) of the cavity arrays 108(i), 118(j) are spaced and oriented to define a first and second thermal media directing channel array 200a, 200b within the respective media cavities 120, 122. The first and second thermal exchange media flows within the respective media cavities 120, 122, guided along the channels 200a, 200b. The thermal media cavity 120 is an enclosure for containing a first thermal exchange media (first media) which flows in thermal contact with the convex surface 111a(i) of each cavity 108(i) of the bed 104.

Thermal exchange media flow connections 130a, b are provided for conducting the first thermal media to communicate with an external heat source or sink (not shown) for transferring heat into or out of the media cavity 120 and consequently to the hydride clusters 110a(i) contained in the cavities 108(i). The flow connections 130a, b are shown as connecting the modules 106a, b, c in series within the tank 102 and exiting through the wall of the tank 102. In other embodiments, modules may be connected by thermal media flow connections in parallel or in series-parallel combinations as required.

The flow connections 130a, b are gas tight and sealed to the respective tank walls and media cavities 120 of the modules 106a, b, c, such that the thermal media therein and the hydrogen gas in the tank 102 are physically isolated.

The thermal media cavity 122 provides for containing a second thermal exchange media (second media) which flows in thermal contact with the array of convex surfaces 111b(j) of each cavity 118(j). Thermal exchange media flow connections 130c, d are provided for connecting the second media to another external heat source or sink (not shown) for transferring heat into or out of the media cavity 122 and consequently to the hydride clusters 110b(j) contained in the cavities 118(j). The connections 130c, d are similarly gas tight and sealed to the respective module cavities 116a, b, c and tank wall 102.

Internal to the tank 102, the multiple modules 106a, 106b, 106c of first hydride bed 104 are interconnected with thermal exchange media connections either in series or parallel, as are the multiple modules 116a, 116b, 116c of second hydride bed 114. The series or parallel connections depend upon the flow rate requirements of the system design.

The media connections 130a–d enter and leave the hydride bed structure 100 through the wall of the tank 102 and may be located anyplace on the tank structure where it is convenient as long as the hydrogen seal integrity is maintained.

The thermal exchange media may be a suitable liquid such as water or oil or other fluid, depending on the operating temperature requirements. A gas could also be used as a cooling or heating fluid.

The spacing and organization of the cavities 120, 122 and the shape of the convex surfaces 111a(i), b may be arranged such that the channels 200a, 200b will induce turbulent flow in the media flowing in the channels 200a, 200b thereby improving the heat transfer between the hydride clusters and the thermal exchange media.

The modules 106a–c of first hydride beds 104 and modules 116a–c of second hydride beds 114 are surrounded by and thermally isolated from each other and from the tank structure 102 by a hydrogen porous, thermal insulating material 140. The insulating material 140 essentially fills the interior of the tank 102 not otherwise filled by the bed structures 104 and 114 and the attached heat exchanger media cavities 120, 122 and media flow connections 130a–d. The thermal isolation 140 between the beds 104 and 114 allows each different hydride $A_h$ and $B_h$ to operate at its own equilibrium temperature with minimum loss of heat to the tank 102, the external environment or to the other bed.

The porous insulating material 140 may consist of any open cell foam, e.g. aerogels, fiberglass and the like, that will maintain their integrity at the operating temperature of the heat pump bed structure 100 and provide sufficiently low impedance to the flow of hydrogen between the two beds 104 and 114.

The thermal insulation 140 is shaped to extend completely around the heat exchangers (the media cavities 120, 122) and hydride beds 104, 114, thereby reducing the effect of the thermal mass contribution of the tank 102 (hydrogen chamber) and pressure lid which is typically metal for strength (but may be made of plastic in some applications). As a result, the mass of the tank 102 does not undergo temperature cycling with the beds 104, 114 as in prior art, but remains at ambient temperature throughout operation.

Elimination of the thermal mass and excess volume of hydrogen gas plumbing which is frequently required in prior art further reduces heat loss carried away by the hydrogen gas. Hydrogen with a specific heat of 13.5 kJ/Kg per deg C. (compared to air—1.0 kJ/Kg or even Helium at 5.2 kJ/Kg per deg C.) can transport significant heat which would be dissipated in unnecessary plumbing. The present invention minimizes wasted heat by eliminating hydrogen plumbing between the banks 104 and 114.

The insulation material 140 also reduces the amount of the interior volume of the tank that is available for hydrogen gas to expand during the evolution and exchange of hydrogen gas between the banks 104 and 114. The absence of external piping, plumbing or valves in the hydrogen flow connection from one bed to the other is an advantage in minimizing energy lost in the wasted expansion of hydrogen.

The first hydride banks 114 and second hydride beds 106 may in principle be rectangular, cylindrical or coaxial in construction and be mounted inside the tank in any optimum packing configuration as long as they are thermally insulated from each other and the tank 102 and interconnected for thermal control in the prescribed manner.

In operation, hydrogen gas at the appropriate pressure (design dependent) is caused to displace all other gases in the tank and completely fill the voids in the porous insulating material 140. The pores of insulating material 140 are chosen large enough to allow free passage of hydrogen between the banks of beds, typically 0.5 to 2 microns.

The first thermal media is directed through the connections 130a, b to flow in the cavities 120 of the first bank 104 of bed 106a, b, c. The second thermal media is directed through the connections 130c, d to flow in the cavities 122 of the second bank 114 of beds 116a, b, c.

Typical hydrides, $A_h$ and $B_h$ are chosen such that the equilibrium pressure of one (hydride $B_h$) is appreciably higher than the other (hydride $A_h$) at the same temperature at which each will be rejecting heat to the environment ($T_s$).

The heat pump is designed to operate between three temperatures. With reference again to FIG. 1, the first temperature $T_s$ is the sink temperature, usually that of the external environment to which heat will be rejected from each hydride in sequence. The second is the temperature $T_h$ to which one of the hydrides (hydride $A_h$) in bank 104 must be raised, providing the heat necessary to cause it to desorb all of its hydrogen at its equilibrium pressure. The third, $T_c$ is the temperature at which the desorbing hydride (hydride $B_h$) in bank 114 will extract heat from its environment (heat exchanger).

At one step of a complete cycle, hydride $A_h$ is thermally connected by connection 130a, b, to a source of high temperature ($T_h$). $T_h$ is the temperature which causes hydride $A_h$ to desorb hydrogen at its equilibrium pressure $P_h$. With hydrogen pressure at $P_h$ within the tank 102, also containing hydride metal $B_{h^1}$, hydride $B_h$ will absorb gas (forming the hydride phase) providing it can reject the heat of formation to the heat sink at $T_s$. Hydride $B_h$, is therefore simultaneously thermally connected to the external environment through the connections 130c, d at temperature $T_s$, rejecting the liberated heat.

When hydride $B_h$ is fully charged (has absorbed all the hydrogen it is capable of at temperature $T_{s^2}$, the hydride $B_h$ is thermally disconnected from the heat sink and thermally connected through connections 130c, d, to $T_{c^1}$ the environment to be cooled. Hydride $A_h$ is simultaneously disconnected from the $T_h$ source and connected to the environment at temperature $T_{s^1}$, while simultaneously in hydrogen communication with hydride $B_h$ through the porous insulation 140.

Hydride $A_{h^1}$, at temperature $T_{h^1}$, will reject heat to the environment at $T_s$ and will attempt to reach equilibrium at pressure $P_l$ and begin to absorb hydrogen. As the gas pressure drops to $P_l$, desorption of hydrogen from hydride $B_h$ draws heat from its environment as it attempts to reach its equilibrium temperature $T_{1^1}$ and providing hydrogen for hydride $A_h$ to absorb. The cycle repeats when hydride $B_h$ is discharged (hydrogen desorbed) and hydride $A_h$ is fully charged again.

Hydrides $A_h$ and $B_h$ communicate thermally with the heat sources and sinks by means of piping and valves controlling the flow of a thermal exchange media (working fluid or fluids) through heat exchangers (not shown).

Hydrogen communication between hydrides $A_h$ and $B_h$ in the tank 102 proceeds directly through the porous insulation 140 and sealing membranes 112a, 112b. No additional piping and valves are required to provide hydrogen communication between the two hydrides. It is a great advantage to eliminate the thermal mass and excess volume necessitated by such hydrogen pipes and valves.

The pressure tank 102 is typically fabricated from a metal acceptably impervious to hydrogen leakage such as aluminum or some types of stainless steel known to have very low hydrogen leakage rates. Several mass production fabrication methods are available. Combinations of thin metallic liners, films or plating coating the inside of the tank 102 to contain the hydrogen may be used with molded engineering plastics to reduce manufacturing cost.

The bed designs shown in FIGS. 2 and 2B for the first hydride bed 104 and the second hydride bed 114, maintain thermal separation of the hydrides $A_h$ and $B_h$ by using individual modules. Rate of change of hydride temperature is increased by increasing the ratio of area to volume of the bulk hydride. The area, Ac, and the depth, Dc, of the cavities 108(i) can be sized to achieve the desired ratio. Expansion pressure of the hydride is reduced by using small cavities appropriately sized to contain the hydride material. The cavities are just filled by the hydride in its hydrided (expanded) form with no stress. When the hydrogen is desorbed and the hydride contracts, the cavity contains a small empty space.

The hydride bed 104 includes an electrical heater 220a in the first media cavity 120. An electrical connection 230 to a power source (not shown) provide electrical power for heating the first media, independent of an external heat source. This is an alternative mode of operation, rendering another external source of heat for desorbing hydride, $A_{h^1}$, unnecessary.

The flat sheets 150a, b of high thermal conductivity material such as aluminum or copper plate is waffled to create an array of cavities 108(i), 108(j) approximately one centimeter by one centimeter square and 0.25 cm. deep.

The cavities 108(i), 108(j) are closely spaced and preferably define openings in the sheet 150a, b which are square shaped although a cylindrical shape is acceptable. The convex surfaces 111a(i) and 111b(j) are preferably shaped having flat bottoms 162a, b for providing the largest possible heat exchange area for the volume of hydride contained in the cavities 108(i).

The cavities 108(i) of bed 104 are filled approximately 75% with a first quantity of a first hydride metal $A_h$. The cavities 118(j) are filled approximately 75% with a second quantity of second hydride metal $B_h$ in the bed 114 (allowing 30% expansion of metal) or alternatively each is loaded 100% with fully hydrided material (already hydrided and expanded).

A sheet of expanded PTFE film with a suitable pore size, for example 0.5–1 micron pore size, is formed into the sealing membranes 112a, 112b, and is attached or bonded to the plate 150a, b covering each of the cavities 108(i), 118(j). The membranes 112a, b may be attached by an adhesive bonding, welding, molding or other suitable process. Other hydrogen permeable, hydride impermeable porous material may be used to form sealing members 112a, 112b. The criteria for selection is to select a low specific heat material to keep the thermal mass low and pore size of nominally one micron.

The depth of the pans 190a, 190b is nominally 0.5 cm. but may vary depending upon the system design requirements for mass flow of thermal fluid media. The pans 190a, 190b are constructed from low specific heat material providing minimum thermal mass.

This results, for this embodiment, in the cavities 108(i), 118(j) protruding into the media cavities 120, 122 for a depth of approximately 0.25 cm. creating an array of 0.5 cm deep channels 200a, 200b surrounding and between all of the cavities 108(i), 118(j).

The beds 106a, b, c and 116a, b, c are separately connected to the respective thermal media connections 130a, b and 130c, d in such a manner that allows for the entrance and exit of different thermal exchange media (fluid, liquid or gas) to the respective media cavities 120, 122 after being appropriately connected to suitable external heat exchangers (not shown). Additional entrance and/or exit fluid manifolds may be optionally added to the pans 190a, 190b to improve fluid circulation if required.

The incorporation of the channels 200a, 200b is important to the reduction of thermal resistance (increased heat transfer) of the heat exchanger. The channels 200a, 200b provide a fluid path for convection heating (cooling) of the sides of the cavities 108(i) as well as the bottoms, increasing the heat transfer area. Further the channels 200a, 200b provide turbulence, increasing the heat transfer coefficient of the fluid. Further, depending upon the depth of the pans 190a, 190b, which controls the size of the channels 200a, 200b, they constitute a manifold improving the circulation of the fluid around the cavities 108(i).

The dimensions of the cavities 108(i) and depth of the pans 190a, b may be varied to reduce thermal resistance, reduce thermal mass and increase heat transfer rates.

The maximum distance from any hydride particle in a particular cluster 110a(i), in a cavity to a heat exchange surface is 0.25 cm plus the thickness of the plate 150a, b (one-two mm.). This constitutes a compromise between minimizing thermal resistance (distance to heat exchanger surface) and area to volume ratio for the cavity (see discussion under Thermal Exchange Area above). Other dimensions may be more appropriate for a specific design.

The pans 190a, b and bonded hydride sheet 150a, b must withstand the design temperature cycling and pressure variations between the hydrogen gas and heat exchange fluid.

The thin foil electrical heating element 220a is located in the cavity 120 of the first hydride bed 104, hydride $A_h$, to be used for producing $T_h$ in the event direct electrical heating is available and desirable. When the heater 220a is used, the media in the pan 190a is blocked from circulating. The media remaining is heated, transmitting heat to the hydride bed 104 by conduction. The leads 230 may be brought out separately through connectors (not shown). The foil heater 220a is sealed as are the leads 230, providing safety against short circuits. Access to the leads 230 can be made outside the hydrogen chamber 102

For other forms of heat availability, the fluid heat exchanger may be used and the electrical heaters left out.

The thermal conductivity of diamond is much greater than that of copper while the specific heat is lower, resulting in faster thermal transfer and lower thermal mass. Recent developments in the field of thin diamond deposition have made possible the deposition of diamond films on a waffled substrate. The film can also be built up to appreciable thicknesses. The substrate is then etched away leaving a waffled slab of pure diamond. The use of diamond may require a supporting mesh or pillar structure underneath the sheet to provide physical strength to withstand pressure differences between the gas chamber and the fluid. Diamond plate is a candidate when it becomes cost effective to manufacture.

EMBODIMENTS

Hydride Bed Embodiment

The specific design will vary for each bed and depend upon the hydride material chosen for the bed since the density, mass ratio of $H_2$ to material in hydride form and reaction enthalpy (heat per gram of hydride) will vary with material. As an example however, Calcium Nickel used in first hydride bed, 104 and Lanthium Nickel Hydride in the second hydride bed 114 will be used. Approximate data from the literature is representative of the design process. The density of the hydrided form of $LaNi_5H_6$ is 6.73 g/cc (hydrided, expanded form). One gram of material in its expanded form requires 0.1486 cc of volume. One gram of hydride will release 0.0138 g of hydrogen (mass ratio of 1.38%) which will expand to 164.6 cc at 20 deg C. and one atmosphere of pressure and absorb 210 Joules of heat (0.199 BTU) upon dehydriding (enthalpy). The actual amounts will vary when the cycle reverses, depending upon the hydride kinetics.

A cavity 118(j) volume of 1×1×0.25 cm=0.25 cc will hold 1.5 g of hydride $B_h$ (in the expanded, hydrided form). Hydrogen flow will amount to approximately 250 cc per half cycle at most. Approximately 0.299 BTU must be transferred each half cycle (a little less on desorption, again depending on material selected). A heat exchange area of about two square centimeters (bottom plus four sides) is provided with the maximum heat conduction path less than 0.25 cm from any hydride particle to the heat exchange surface 150b.

An aluminum sheet about 12 cm×12 cm (for example) is waffled with depressions about 1 cm×1 cm, 0.25 cm deep, space about 0.5 cm apart, providing the sheet 150b containing approximately 121 cavities 118(j). The sheet thickness is chosen to withstand the pressure difference between the gas at $P_h$ (nominally 150–200 psi) and the heat exchange fluid (nominally 30 psi).

The sheet 150b is bonded (welded) to the pan 190b approximately 0.5 cm deep with nipples 130c, d at opposite ends of the pan 190b for the flow of heat exchange fluid (media) through the resulting 12 cm×12 cm×0.25 cm cavity with 0.5 cm deep channels 200b between the cavities 118(j). The media will be in direct contact with the bottom 162b and sides of each cavity 118(j), providing large thermal contact area per volume of hydride cluster 110b(j). The integrated structure 106 (hydride module) provides a method of holding the metal hydride particle clusters 110b(j) within the concave surfaces 109b(j) of the sheet 150b which in turn is in close contact with the heat exchange media flowing through the hollow cavity 122 on the convex surfaces 111b(j) on the opposite of the sheet 150b.

The sealing membranes 112b are provided, for example, by a 12 cm×12 cm sheet of a porous membrane sealed in place over the hydride cluster cavities 118(j), sealing in the hydride clusters 110b(j). One choice is PTFE film used in clothing and commercially known as "Gortex" and medical filters available from the Pall Corp. Teflon will function at the temperatures required for most applications and it will have a low thermal mass in contact with the bed. It has sub micron size pores (0.2 micron) and passes air at 10 cc/sec/cm$^2$. At this rate, the hydrogen will take 25 seconds to pass through the membrane 112b limiting the cyclic rate to one minute. In practice, hydrogen will flow faster than air and also it is possible to increase the pore size to 1 micron from 0.2 microns, dramatically increasing the gas flow rate. Other membranes or sheets of porous material may be used in principle.

Alternatively, the porous membrane 112a, 112b are sufficiently flexible, resilient, sized and shaped such that, at full absorption, the preselected quantity of absorbed hydride cluster contained therein causes the resilient member to flex to just absorb the expanded hydride cluster. Additionally, at full hydrogen desorption of the hydride cluster contained therein, the resilient members flexing sufficiently such that the desorbed hydride cluster is fully compressed in an essentially contiguous cluster in thermal contact with the side of the cavity extending outward from the sheet into the media cavity, whereby essentially all of the hydride cluster is in essentially contiguous thermal contact with the thermal transfer media throughout a complete hydrogen absorption, desorption cycle.

The porous membranes 112a, 112b are resilient material affixed to the sheet 150a, 150b such that the particles in the hydride clusters 110a(i), 110b(j) are held in compressive contact throughout the expansion and contraction of the hydride as it absorbs and desorbs hydrogen. The compressive contact of the clusters 110a(i), 110b(j) within themselves and in contact with the concave surfaces 109a(i), 109b(j) caused by the alternative resilient membrane 112a, 112b improves the heat transfer through the conductive sheets 150a, 150b to the thermal media in the cavities 120, 122.

Finally, each bed is completely encased in thermally insulating material 140 except for the entrance and exit connections 130a, b and 130c, d that are connected in series in this embodiment. The insulation material 140 is porous (for example open cell foams), allowing passage of the hydrogen gas. If the pore size of the insulation 140 is of the order of one micron, then the porous membrane 112b can be eliminated, the insulation 140 providing the filtering.

The size of the beds 104, 114 may be varied to meet design objectives and dimensions may be varied to achieve the same design goals. As many pairs of hydride bed combinations as are desired may be grouped in the single chamber for increased heat pumping capability.

Heat Pump Embodiment

With reference to FIG. 6 and FIG. 2 there is illustrated a first embodiment of a heat pump 245 in accordance with the present invention.

The single tank 102 containing separate hydride bed modules for hydride $A_h$ in hydride bank 104 and hydride $B_h$ in hydride bank 114 and hydrogen gas can be used to form a heat pump with the addition of external heat exchangers, pumps for circulation of heat exchange medium, a spooler for controlling fluid valves (flow between exchangers) and an electronic processor to control the cycling of the pump.

Piping (tubing) and pumps 252a, 252b are connected to spooler 250 and heat exchangers Tc and Ts. The spooler 250 is in turn connected to fluid connections 130a–d in such a way that the spooler 250 will connect the hot heat exchanger $T_s$ and its pump 252b to second hydride bank 114 on the first half cycle of operation and to the first hydride bank 104 on the second half of the cycle. Simultaneously, the cold heat exchanger Tc and its pump 252a are shunted (fluid does not circulate through first hydride bank 104) by the spooler 250 during the first half cycle of operation (heat coming from the electrical foil heater 220a) and is connected to second hydride bank 114 during the second half of the cycle. Temperature sensors 240a, b are placed in the fluid lines 130a, c exiting from each hydride bank 104, 114 and provide signals 260a, 260b to electronic controller 270. Alternatively, the temperature sensors 240a, b may be installed in the media cavities 108(i), 118 (refer to FIG. 2) of the hydride banks 104, 114. Further, some types of foil heaters may be used as temperature sensors by periodically measuring their resistance. The controller 270 routs power pulses over cable 280 to the electrical heater 220a in first hydride bank 104 through connector 290. It also controls the pumps 252a, 252b through power cables 310a, 310b and the spooler 250 through cable 300. Input power is provided through cable 320.

Two 12 cm×12cm hydride beds, one for CaNi and one for LaNi will each hold approximately 181.5 grams of metal in the hydride (charged) condition. Assuming 90% absorption and desorption and a cycle rate of 15 times per hour (four minute cycles), the pump 245 is capable of cooling a heat load of approximately 488 BTU/hr minus heat loss and waste heat. In the illustration, three beds are shown in each bank 104, 114 providing a heat pumping capability of over 1450 BTU/hr.

Controller

The electronic controller 270 may be a commercially available processor, may be analog, digital or fluidic and is programmed as a proportional controller, automatically adjusting the duty cycle (period) and frequency of the hydriding cycle as a function of the operating temperatures and heat pumping requirements. The increased cycling capability of the invention makes the use of a proportional controller cost effective compared to operating a conventional heat pump full on or full off to control temperature.

Heater

When the foil heater 220a is used to provide $T_{h_1}$ hydride $A_h$'s heat exchanger cavity 120 (refer to FIG. 2) is not used during the heating portion of the cycle. The fluid in the exchanger cavity 120 will be heated to $T_h$ and provide close, uniform thermal contact with the bed 104. The fluid in cavity 120 is not circulated, rather its flow is blocked by the spooler 250 and only the fluid trapped in the tray (heat exchanger) 120 is heated, again minimizing the thermal mass undergoing temperature change.

Fluid Pump

For maximum cycle rate, two fluid circulation pumps 252a, 252b may be used. Cycle speed is strongly influenced by the rate of heat removal and supply during each half cycle. Further, the thermal efficiency will depend upon the amount of "wasted" heat in the system. The issue is the thermal mass of the pump and fluid it contains at the end of each half cycle. If a single pump is used, then it and some mass of circulating fluid must cycle between the temperature extremes $T_h$ and $T_c$, or at least $T_s$ and $T_c$ if a separate foil heater is used. The heat loss of this thermal cycling is wasted and reduces the efficiency of the pump. If two pumps are used and the combination of each pump and external heat exchanger are switched by the spooler 250 each half cycle, then each pump stays at its own operating temperature with a minimum of heat loss.

Spooler

The spooler 250 is an assembly of fluid valves and a manifold, available commercially (Parker Hannifin, Clippard) that will direct the fluid along two or more paths, acting like electrical multiple pole, multiple throw switches. They can be actuated either by mechanical motion off a motor shaft or bellows position, or electronically from signals generated by sensors mounted on the shaft (position) or in the hydride chamber 102 (temperature, pressure).

Spoolers are available commercially with built in actuators and manifolds. The advantage lies in the ability to program the pump to use sensor feedback information and accommodate varying conditions of sink temperature (winter vs summer operation) and heat load being pumped. The system can be operated at maximum efficiency based on environment rather than around a fixed operating point independent of the environment. For example, if it is very hot outside the temperature difference between fluid and the rejection temperature (outside) may be smaller, requiring a longer period of time to reject the hydride heat. The microprocessor control will automatically adjust the timing of each portion of the cycle resulting in higher efficiency.

Bellows Configuration

With reference to FIG. 7 there is illustrated an embodiment of a hydride absorption/desorption bed 500 in accordance with the present invention. The bed 500 is shown without the external heat exchangers, pumps, controller etc. Similar reference numbers refer to similar elements as described with reference to FIG. 2 and 2b.

A portion of the tank 102 containing hydrogen is replaced by a sealed bellows assembly 510 which encloses hydride beds 104, 114 as previously indicated. The bellows assembly 510 allows for physical movement of one end 530 of the bellows 510 while containing the hydrogen gas within. The assembly 510 is mounted on a frame 520. The bellows end 530 has a piston rod 540 attached to it so that the rod 540 moves in a bushing 550 in response to expansion and contraction of the bellows 510, in turn as a result of hydrogen gas pressure inside the bellows. An adjustable stop 560 is attached to the rod 540 to set the limit of expansion desired. The contraction limit is automatically determined by the bellows 510 compression.

In addition to heat pumping, some mechanical work can be extracted from the expansion and contraction of the hydrogen gas within the bellows 510 as it undergoes pressure changes with each cycle as described above. The amount of energy expended in mechanical work by the expanding and contracting bellows can be controlled by using mechanical limits on the bellows movement. Linear devices such as a linear electric generator or a scotch yoke (translates linear to rotary motion) attached to the connecting rod 540 may be used to convert the mechanical energy to a more useful form. Work extracted is of course not available for heat pumping. The bellows material is typically metal but may be any material that will hold hydrogen under pressure.

As an alternative, the solid tank 102 may be retained and a smaller bellows suitably attached to a hole in the case, for example where the piston rod is located. The sealed end of the bellows is in turn attached to a device that will convert the linear motion to a desired form of mechanical energy. The smaller diameter of this bellows will transmit less power (function of pressure times area of the piston) but may be more convenient for smaller mechanical loads.

Total engine operation is achievable with the bellows configuration by the simple expedient of using only one hydride type and eliminating the cold heat exchanger $T_c$. Only one hydride type is required to generate the pressure variations. $T_h$ is selected to provide the desired equilibrium pressure (depending upon hydride selected) for bellows expansion and can be provided either with the foil heater or fluid heat exchange with an external source. The heat exchanger is then cycled to the $T_s$ external heat exchanger, dropping the equilibrium pressure for the contraction stroke.

HYDROGEN STORAGE EMBODIMENT

In another embodiment of a hydride bed structure in accordance with this invention, a bank of single hydride beds may be used to store, transfer and supply hydrogen gas for use as a fuel, for example in automotive applications. Referring again to FIG. 2, a single bank 104 of hydride beds 106 a, b, c may be contained in a sealed tank 102.

A planar array of spaced apart cavities 108 are formed in a thermally conductive sheet 150a. The shape and disposition of cavities 108 are as described in reference to FIG. 2 and 2b. The cavities 108 contain clusters of hydride 110a(i) of a single type on one side of the sheet 150a. The hydride clusters 110a(i) would be charged with hydrogen by a sealingly disconnectable gas flow connection (e.g., inlet valve) 246 to the external hydrogen source (e.g., hydrogen tank) 248. The heat evolved during the charging of the hydride 110a(i) would be removed by conduction through the sheet 150a into a flow of thermal exchange media along channels 200a formed on the other side of the sheet 150a in a media cavity 120. Disconnectable connections 130a, b for the flow of thermal exchange media from the cavity 120 to an external environment (not shown) would allow for the heat generated by the hydrogen absorption of the hydride 110a(i) to be dissipated in an external heat sink (not shown) thus enabling a rapid charging of hydrogen into the hydride clusters 110a(i). The heat thus generated could be reclaimed thereby providing an additional energy savings.

The divided cluster cavities 108(i), disposed in a flat planar array as shown in FIG. 2b and described above, provide the advantage of low thermal resistance of the waffled sheet 150a to a thermal exchange media, and consequently a short refueling time for an automobile or delivery truck. The stable and rugged construction of the hydride tank 102 provide a superior margin of safety compared to storage of liquid fuels.

Hydrogen fuel gas is extracted by reconnecting the hydride bed 104 through a detachable connection to an engine (not shown), and then heating the hydride 110a(i) with a heater 220a or a different thermal media (for example air) in the cavity 120.

While the foregoing detailed description has described several embodiments of the hydride beds in accordance with this invention, it is to be understood that the above description is illustrative only and not limiting of the disclosed invention. It will be appreciated that it would be possible to modify the size, shape and materials used to form the cluster cavities, the thermal media cavities, the enclosing tank and connections, the configuration thereof, and the type and quantity of the hydride whether solid, liquid, fibrous, or the like, or whether one or more sets of modules are used. Using the principles disclosed in accordance with this invention one can define various hydride absorption/desorption apparatus and systems which includes or excludes various elements within the scope and spirit of this invention. Thus, the invention is to be limited only by the claims as set forth below.

I claim:

1. A hydrogen absorbing/desorbing hydride module, comprising:

a fluid impermeable, thermally conductive sheet having two sides;

an array of spaced apart hydride cluster cavities laterally disposed on one side of the sheet, each cluster cavity defined by a respective concave surface on the one side of the sheet;

an array of corresponding spaced apart convex surfaces on the other side of the sheet, each convex surface adjacent to each respective concave surface with a portion of the conductive sheet therebetween;

a fluid impermeable pan member sealed to the other side of the conductive sheet, the pan member shaped to enclose and receive the array of convex surfaces in a thermal exchange media cavity defined therebetween;

thermal media flow connections to the media cavity providing thermal media flow communication thereto;

a plurality of hydride clusters having a defined EDP characteristic, the clusters contained within the respective cluster cavities;

hydrogen permeable, hydride impermeable sealing members sealed to the one side of the sheet such that each hydride cluster is sealed in the respective cluster cavity, whereby hydrogen gas may be absorbed or desorbed from the hydride clusters when a hydrogen containing gas is in flowing contact with the hydride clusters through the sealing members and the hydride clusters are cooled or heated by a thermal exchange media of suitable temperature circulating in the thermal exchange media cavity.

2. A hydrogen absorbing/desorbing hydride module as set forth in claim 1, including:

a heater in thermal communication with the hydride for heating the hydride clusters to desorb hydrogen previously absorbed therein.

3. A hydrogen storage/supply hydride bed system comprising;

one or more of the hydrogen absorbing/desorbing hydride modules set forth in claim 1;

a single hydrogen pressure tank containing the one or more of the hydrogen absorbing/desorbing hydride modules;

a hydrogen porous, thermal insulating material within the tank, surrounding the one or more of the hydrogen absorbing/desorbing hydride modules providing for hydrogen gas in the tank to flow from the hydrogen porous, thermal insulating material surrounding the one or more of the hydrogen absorbing/desorbing hydride modules through the hydrogen permeable sealing members to the hydride clusters during absorption and from the hydride clusters through the hydrogen permeable sealing members during desorption into the hydrogen porous, thermal insulating material surrounding the one or more of the hydrogen absorbing/desorbing hydride modules.

4. In a heat pump system having a plurality of external thermal exchange media sources/sinks, a hydrogen storage/supply hydride bed system as set forth in claim 3, wherein the thermal media flow connections of respective ones of the one or more of the hydrogen absorbing/desorbing hydride modules may be switchably and sealingly connected to at least one of the external thermal exchange media sources/sinks suitable for circulating the respective thermal exchange media within the respective media cavities for rapid heating or cooling of the respective hydride clusters during hydrogen desorption and absorption.

5. A hydride heat pump bed structure, comprising:

a first plurality of hydrogen absorbing/desorbing hydride modules as set forth in claim 1;

a second plurality of hydrogen absorbing/desorbing hydride modules as set forth in claim 1, wherein:

the first plurality of the hydrogen absorbing/desorbing hydride modules and the second plurality of the hydrogen absorbing/desorbing hydride modules are enclosed in a single sealed hydrogen pressure tank;

a thermally insulating, hydrogen permeable porous material configured to thermally insulate the first plurality of the hydrogen absorbing/desorbing hydride modules and the second plurality of the hydrogen absorbing/desorbing hydride modules from each other and the pressure tank and provide hydrogen communication between the first plurality of the hydrogen absorbing/desorbing hydride modules and the second plurality of the hydrogen absorbing/desorbing hydride modules within the single tank;

the hydride clusters of the first plurality of the hydrogen absorbing/desorbing hydride modules are comprised of a first hydride, Ah, having a first equilibrium disassociation pressure characteristic;

the hydride clusters of the second plurality of the hydrogen absorbing/desorbing hydride modules are comprised of a second hydride, Bh, having a second equilibrium disassociation pressure characteristic with a lower equilibrium disassociation pressure when the second hydride, Bh, is at the same temperature as the first hydride Ah.

6. A hydride module as set forth in claim 1, wherein:

the respective hydrogen permeable and hydride impermeable sealing members containing the preselected quantity of hydride cluster within the respective cluster cavities are sufficiently flexible, resilient, sized and shaped such that, at full absorption, the preselected quantity of absorbed hydride cluster contained therein causes the resilient member to flex to just absorb the expanded hydride cluster, and additionally, at full hydrogen desorption of the hydride cluster contained therein, the resilient member flexing sufficiently such that the desorbed hydride cluster is fully compressed in an essentially contiguous cluster in thermal contact with the side of the cavity extending outward from the sheet into the media cavity, whereby essentially all of the hydride cluster is in essentially contiguous thermal contact with the thermal transfer media throughout a complete hydrogen absorption, desorption cycle.

7. A hydrogen absorption/desorption hydride bed as set forth in claim 1, wherein:

each cluster cavity being sized such that, at full absorption, the absorbed hydride cluster contained therein essentially just fills the cavity.

8. A hydrogen absorbing/desorbing hydride module as set forth in claim 1 wherein;

the array of convex surfaces is disposed with spacing, organization and shapes sufficient to induce turbulent flow in the thermal exchange media of suitable temperature circulating in the thermal media cavity.

9. A hydride module as set forth in claim 1, wherein:

the convex sides of the cluster cavities include an essentially flat surface.

10. A hydride heat pump bed structure, as set forth in claim 5, wherein:

a portion of the single sealed hydrogen pressure tank is adapted to mechanically flex during hydrogen desorption and absorption exchange between the first plurality of the hydrogen absorbing/desorbing hydride modules and the second plurality of the hydrogen absorbing/desorbing hydride modules, therein such that mechanical work may be extracted by the flexure thereof.

11. A hydride module as set forth in claim 8 wherein:

the surface area of the convex surfaces is apportioned such that about one-half defines the channels there between.

12. A hydride module as set forth in claim 11 wherein:

the convex surfaces protrude about 0.25 cm deep into the media cavity.

13. A hydride module as set forth in claim 11 wherein:

the convex surfaces of each cavity define a bottom area of about 1 $cm^2$.

* * * * *